United States Patent
Harville et al.

(10) Patent No.: US 7,528,860 B2
(45) Date of Patent: May 5, 2009

(54) METHOD AND SYSTEM FOR VIDEOCONFERENCING BETWEEN PARTIES AT N SITES

(75) Inventors: Michael Harville, Palo Alto, CA (US); Donald O. Tanguay, Jr., Sunnyvale, CA (US); Henry Harlyn Baker, Los Altos, CA (US); W. Bruce Culbertson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 732 days.

(21) Appl. No.: 11/118,914

(22) Filed: Apr. 29, 2005

(65) Prior Publication Data

US 2006/0244817 A1 Nov. 2, 2006

(51) Int. Cl.
*H04N 7/14* (2006.01)
*G06F 3/00* (2006.01)

(52) U.S. Cl. ............... 348/14.08; 348/14.09; 348/14.12

(58) Field of Classification Search ... 348/14.01–14.16; 709/204; 345/753, 757; 379/93.21, 93.23
See application file for complete search history.

(56) References Cited

U.S. PATENT DOCUMENTS

| 4,400,724 | A  | * | 8/1983 | Fields ........................ 348/14.1 |
| 6,853,398 | B2 | * | 2/2005 | Malzbender et al. ..... 348/14.09 |
| 2005/0053278 | A1 | * | 3/2005 | Li ............................... 382/164 |
| 2005/0162511 | A1 | * | 7/2005 | Jackson ....................... 348/61 |

\* cited by examiner

*Primary Examiner*—Melur Ramakrishnaiah

(57) ABSTRACT

A method and system for videoconferencing between parties at N sites. Specifically, a virtual space arrangement of N sites is created. Video sequences of N−1 remote sites are simultaneously displayed on a non-planar display arranged around a local party at a local site consistent with the virtual space arrangement. The displayed images of the remote parties are scaled consistently with their true physical sizes at their distances from the local party in the virtual space arrangement. Real-time video streams of the local party are captured from a plurality of viewpoints and are used to generate N−1 video view streams representing views of the local party from approximately the local display locations of the N−1 remote parties.

30 Claims, 18 Drawing Sheets

METHOD AND SYSTEM FOR VIDEOCONFERENCING BETWEEN PARTIES AT N SITES

TECHNICAL FIELD

The various embodiments of the present invention relate to videoconferencing. More specifically, various embodiments of the present invention relate to scalably reconfiguring physical videoconferencing infrastructure to achieve approximate eye contact between N parties at separate physical sites, for any N greater than or equal to 2.

BACKGROUND ART

Video conferencing is an established method of collaboration between remotely located participants. A video image of a remote environment is broadcast onto a local display allowing one or more participants at a local site to see and talk to one or more remotely located participants.

Some videoconferencing applications seek to provide physically realistic eye contact between participants at remote sites. This can be referred to as "person-accurate", or "personalized", eye contact. For a two-person videoconference, this can be accomplished by orienting the camera viewing a local participant at each site to view him from the direction at which the remote participant is displayed to the local one. For a three-person video conference, where each participant is at a different site, accurate eye contact is achieved by using two cameras at each site, and having them directed toward the local participant from the directions at which the remote participants are displayed. The view sent to each remote participant should be that from the camera oriented along the direction at which that remote participant is displayed to the local user.

In general, for any number of N participants at N sites, N–1 cameras may be used at each site and positioned around the local participant to capture images of the local participant. These images of the local participant are taken from correct viewpoints of the N–1 remote participants. These images are then sent to each remote participant providing a view of the local participant from the direction at which that remote participant is displayed to the local one.

A disadvantage of these video conferencing systems is that they require a different number of cameras for each choice of N. Also, as N increases, it requires more and more remote participants to be displayed to the local one, such that many display systems will produce reasonable representations of the remote participants for only a limited range of N. Finally, if the number of participants at a given site is greater than one, it is no longer possible to maintain accurate eye contact for each participant unless unconventional displays are used. Specifically, either costly three-dimensional displays, or displays showing different images to different viewing directions, would be needed.

Moreover, as the number of parties in multi-party videoconference change, videoconferencing systems that make some attempt to provide eye contact between remote participants require the reconfiguration of the physical equipment needed for capture. That is, videoconferencing systems that attempt to maintain "person-accurate" eye contact do not allow for scaling up or down the number of participants in a video-conferencing session, or changing the number of participants from one video conferencing session to the next, without physically changing or reconfiguring the equipment needed for capture and display.

Therefore, prior art methods of video conferencing were unable to satisfactorily provide for supporting an increasing number of parties in a video conference without physical reconfiguration of the capture and/or display hardware. Also, techniques of video conferencing were unable to satisfactorily provide adequate eye contact between remotely located participants, especially as the number of participants at each site number more than one.

DISCLOSURE OF THE INVENTION

A method and system for videoconferencing between parties at N sites. Specifically, a virtual space arrangement of N sites is created. The virtual space arrangement includes N–1 remote sites and a local site, wherein each site accommodates a party comprising at least one person. At each site, video sequences of N–1 remote parties are simultaneously displayed at display locations on a non-planar display arrangement arranged around the local party at the site. The display locations of the remote parties are consistent with the virtual space arrangement. The display locations of the N–1 remote parties are directionally consistent with the virtual space arrangement, and the displayed images of the remote parties are scaled consistently with their true physical sizes at their distances from the local party in the virtual space arrangement. This directional and scale consistency helps provide reciprocal site-accurate eye contact between a local party at the local site and the N–1 remote parties at the N–1 remote sites. Real-time video streams of the local party are captured from a plurality of viewpoints and are used to generate N–1 video view streams in real-time of the local party. Each of the N–1 video view streams represents a view of the local party from approximately the local display location of one of the N–1 remote parties, thereby helping the N–1 video view streams provide the reciprocal site-accurate eye contact.

BRIEF DESCRIPTION OF THE DRAWINGS

The above and other objects and advantages of the present invention will be more readily appreciated from the following detailed description when read in conjunction with the accompanying drawings, wherein.

BEST MODES FOR CARRYING OUT THE INVENTION

Figure 1:
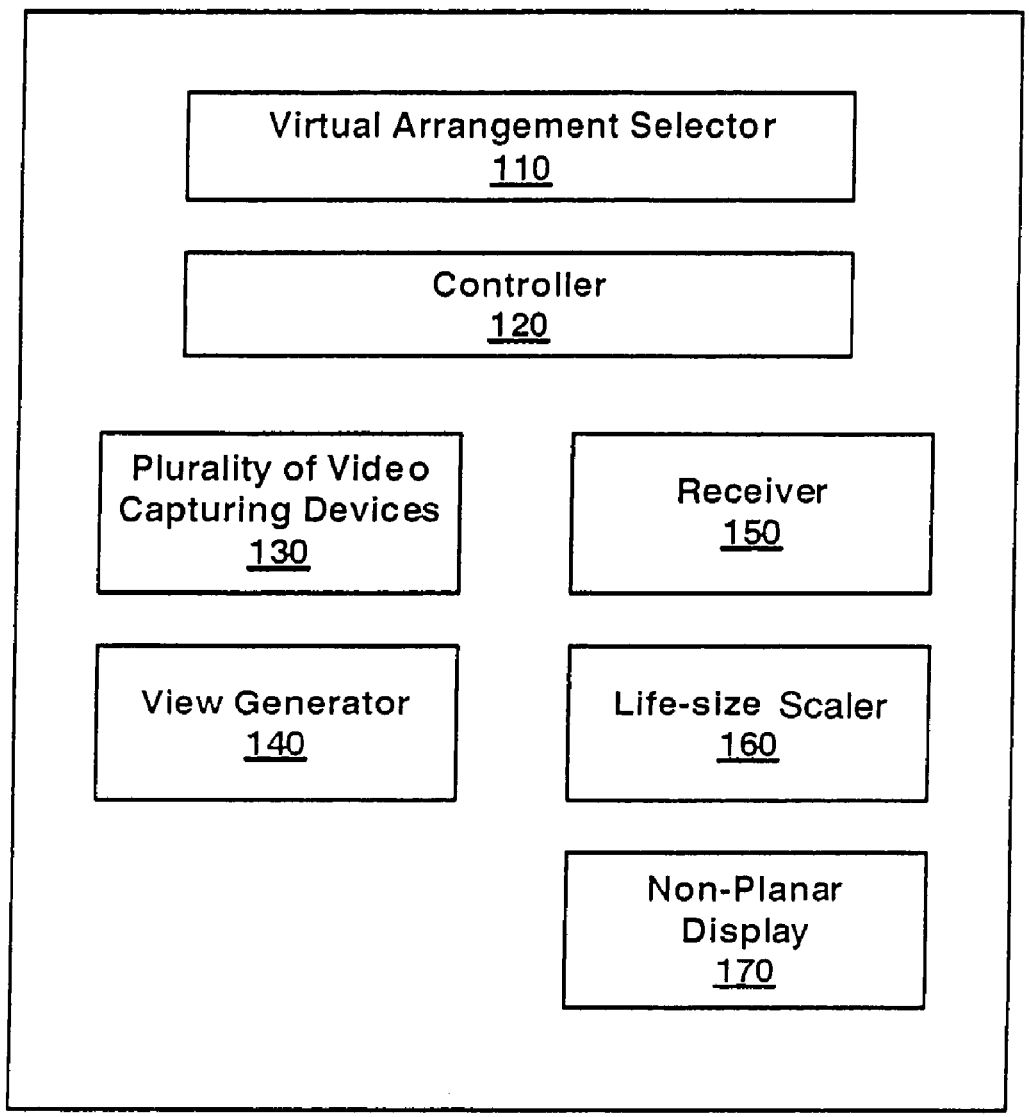
FIG. 1 is a block diagram illustrating a system for videoconferencing between N parties at N sites that is capable of achieving site-accurate eye contact, in accordance with one embodiment of the present invention.

Reference will now be made in detail to embodiments of the present invention, a method and system for videoconferencing between parties at N sites, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for providing videoconferencing between N parties at N sites, and can be implemented on a computer readable medium. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "creating," or "displaying," or "scaling," or "capturing," or "generating," or "adapting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for videoconferencing between N parties distributed across N separate physical sites, where N is greater than or equal to two. Specifically, embodiments of the present invention approximate for the parties at each site the illusion that the parties at all other sites are arrayed before them in space in a manner that is physically consistent across all the sites. As a result, other embodiments of the present invention serve the above purpose and are capable of supporting a changing number of sites in one video conference or between video conferences without physical reconfiguration of the capture and/or display hardware. That is, embodiments of the present invention can accommodate different values of N (the number of parties) without the need for human configuration of the physical equipment at any of the N sites. For example, it is not necessary to move any display surfaces, manually select or position cameras and microphones to be used, or install new displays or cameras when N changes during a video conference, or between video conferences. Also, other embodiments of the present invention serve the above purpose and are able to provide site-accurate eye contact between parties at each of the N sites.

In addition, in another embodiment, accurate, per-participant eye contact and gaze alignment can be achieved if there is a single participant for each party at each of the N sites. This is possible for any number of N parties at N sites.

System for Providing Video Conferencing

Referring now to FIG. 1, a system 100 is shown that is capable of providing videoconferencing between N parties at N sites, in accordance with one embodiment of the present invention. Site-accurate eye contact is achieved by providing the illusion that parties at all other sites are arrayed before them in space in a manner that is consistent at all the sites with a single arrangement of the parties in some virtual space. The system comprises a virtual arrangement selector 110, a controller 120, a plurality of video capturing devices 130, a view generator 140, a receiver 150, a life-size scalar 160, and a non-planar display 170.

The virtual arrangement selector 110 creates an arrangement of N sites, including N−1 remote sites and a local site, in a virtual space. Each of the sites accommodates a party comprising at least one participant. The non-planar display 170 simultaneously displays N−1 video sequences of representations of the parties at the N−1 remote sites. That is, the N−1 remote parties are displayed at display locations on the non-planar display arrangement 170. The display arrangement 170 is arranged around a local party at the local site. The N−1 remote sites are displayed to provide reciprocal site-accurate eye contact between a local party at the local site and the N−1 remote parties. To this end, the display locations of the remote parties are directionally consistent with the virtual space arrangement. That is, from a preferred physical position of the local party at the local site, display locations of remote parties appear in physical directions that approximate the directions between the local party and the respective remote parties in the virtual space arrangement. Further, the life-size scaler 160 scales displayed images of the remote parties in the N−1 video sequences consistently with their true physical sizes at their distances from the local party in the virtual space arrangement.

The plurality of video capturing devices 130 captures a plurality of real-time video streams of the local party from a plurality of viewpoints. The view generator 140 generates N−1 video view streams in real-time of the local party using the plurality of real-time video streams captured of the local party. Each of the N−1 generated video view streams represents a view of the local party from a local display location corresponding to one of the N−1 remote parties. In addition, each of the N−1 video view streams helps provide reciprocal site-accurate eye contact. The controller 120 adapts the system 100 to a new virtual space arrangement that accommodates a change in N without physical reconfiguration of the non-planar display arrangement 170 and without physical reconfiguration of the plurality of video capturing devices 130.

In addition, the system 100 includes a receiver 150 to receive from the N−1 remote sites video sequences portraying images of the N−1 remote parties. Each of the video sequences either represents, or may be used to construct, a view of a corresponding remote party that is consistent in both direction and scale with the virtual space arrangement. Also, the system 100 optionally includes a background removal module (not shown) that performs background removal to extract the parties at the N−1 remote sites from their physical backgrounds. In addition, an optional compositor (not shown) composites the parties of the N−1 remote sites on a single continuous background for display on the non-planar display arrangement 170. Also, an optional recorder (not shown) records the videoconferencing between the N parties. An optional audio spatializer (not shown) renders audio received from the N−1 remote sites in a spatially consistent manner with the virtual space arrangement exhibited at the local site. That is, the audio heard by the local party seems to emanate from the respective directions of the remote parties in the virtual space arrangement of the N parties.

Site-Accurate Eye Contact and Circular Virtual Space Arrangements

Figure 2A:
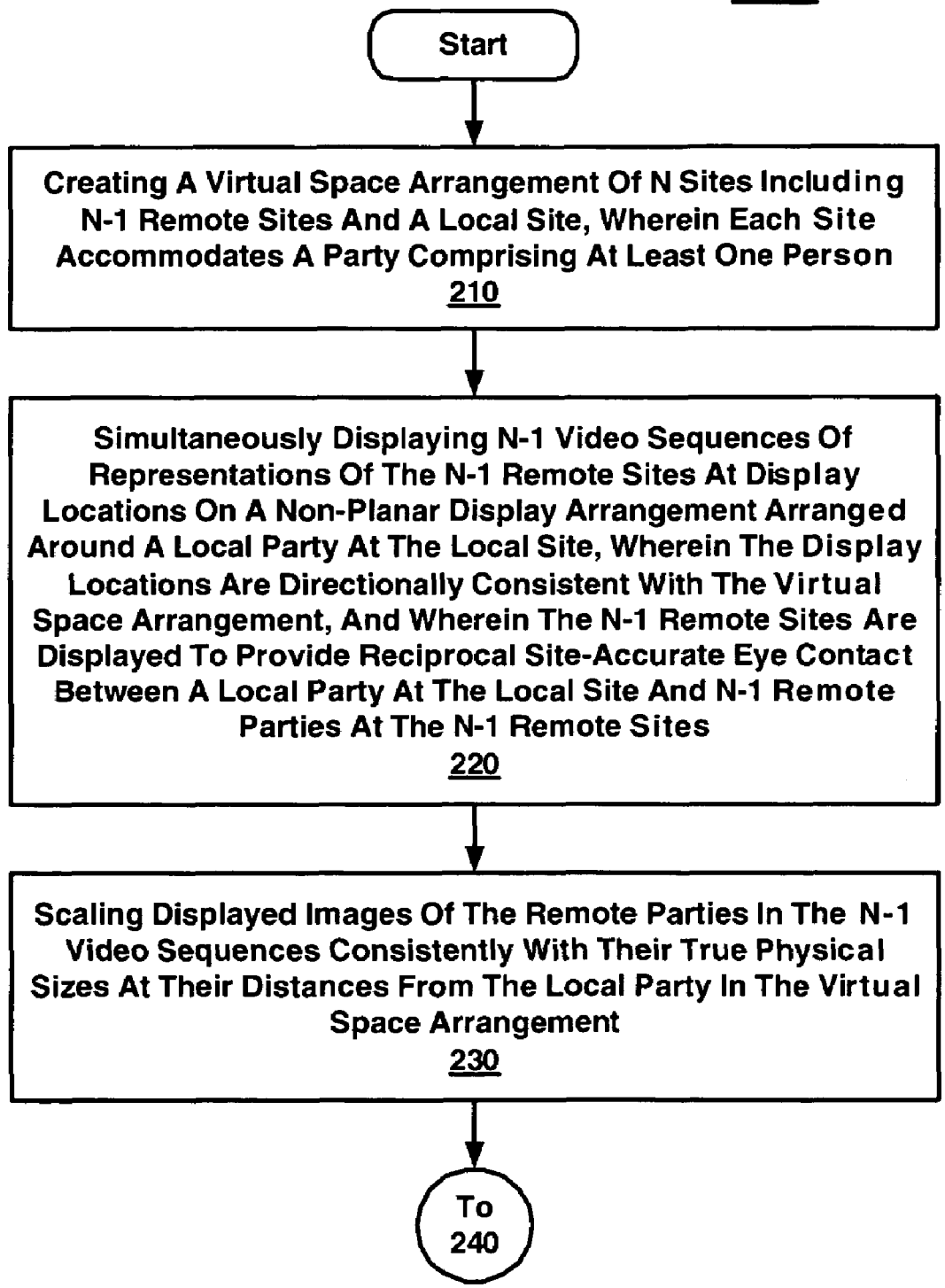
FIG. 2A is a flow chart illustrating steps in a computer implemented method for videoconferencing between N parties at N sites that is capable of achieving site-accurate eye contact, in accordance with one embodiment of the present invention.

FIG. 2A is a flow 200A chart illustrating steps in a computer implemented method for providing videoconferencing between N parties at N sites, in accordance with one embodiment of the present invention. Specifically, the method of FIG. 2A is able to provide site-accurate eye contact between parties in the videoconference. Assuming participants at each site have a similar viewpoint with respect to their display arrangement, site-accurate eye contact is achieved by displaying remote parties at each local site in a manner consistent with a single virtual space arrangement, and by generating views of the local party from directions that correspond approximately to the local display locations of remote parties.

The term "site-accurate eye contact" is herein defined analogously to "person-accurate eye contact", except that the former treats all participants at a given site as a single entity, while the latter applies individually to each participant. When person-accurate eye contact is achieved in videoconferencing, a given person will typically correctly perceive when any other person is looking at his displayed representation, and that given person will also typically perceive an increasing lack of eye contact with any other person who is looking at representations of people that are displayed increasingly far from the representation of this given person. Similarly, when site-accurate eye contact is achieved in videoconferencing, a given participant is likely to correctly perceive when people at remote sites are looking at displayed representations of some member of his party, but may not be able to determine which member of his party is being viewed. Further, as people at remote sites look at representations of parties displayed at increasingly far locations from the displayed representation of the given paricipant's party, the given participant experiences an increasing loss of eye contact with those people. Further descriptions and methods for achieving site-accurate contact are provided below.

At 210, the present embodiment creates a virtual space arrangement of N sites including N−1 remote sites and local site. Each site accommodates a party comprising at least participant. More specifically, all participants at a given site are treated as a single "party"in the videoconference. Further, the videoconference is a communication between N parties, each of which optionally supports multiple participants, at N different sites. In one embodiment, the virtual space arrangement of the N sites is translated into a virtual coordinate system that corresponds to the virtual space arrangement.

At each site, the N−1 remote parties are physically displayed in a manner that is consistent with their location in the virtual space arrangement. The virtual space arrangement may be in one, two, or three-dimensional space, but all communicating sites must agree on the same arrangement. In addition, all the participants at a given site are assumed to be located in close proximity in comparison to the dimensions of the display arrangement they view so that all of them can have similar viewpoints with respect to the display arrangement.

Figure 3A:
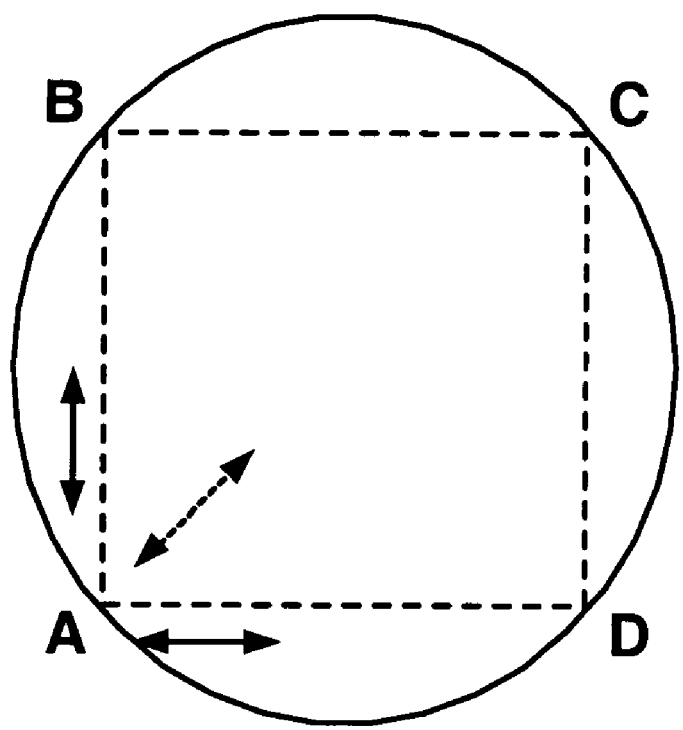
FIGS. 3A, 3B, and 3C provide illustrations of exemplary virtual space arrangements of N parties, such that the N parties are located at equally spaced positions around a two-dimensional circle, for values of N of four, five, and six.
Figure 3B:
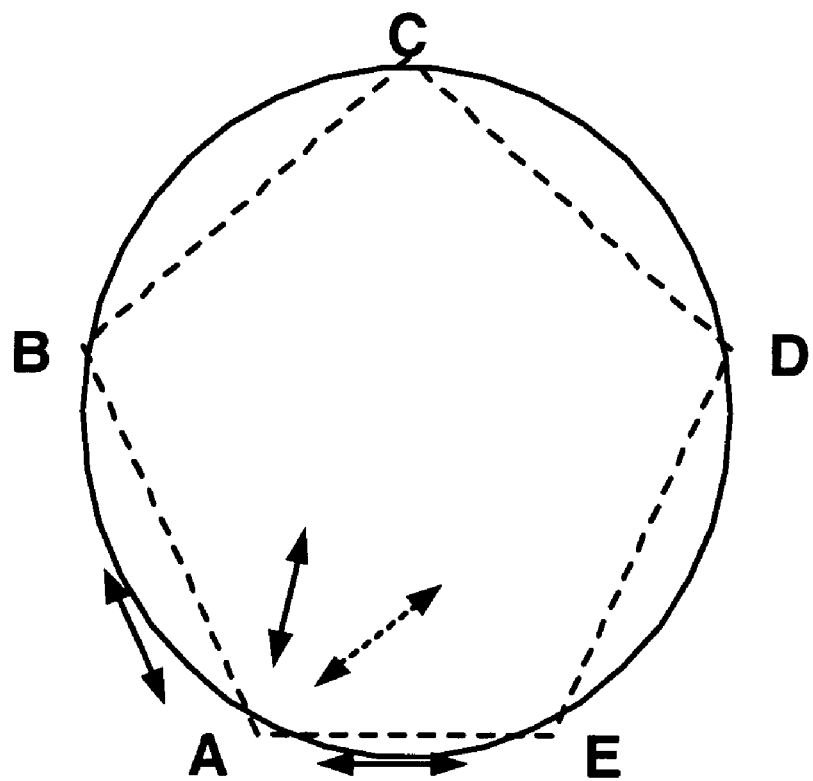
Figure 3C:
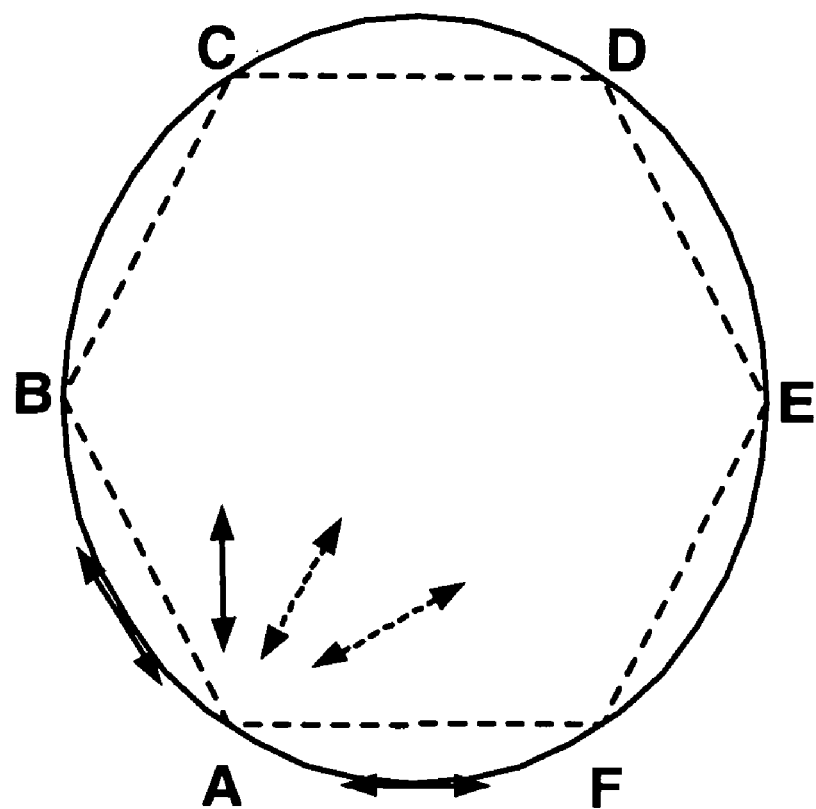

FIGS. 3A, 3B, and 3C provide illustrations of exemplary virtual space arrangements of N parties, such that the N parties are located at equally spaced positions around a two-dimensional circle. In FIG. 3A, four parties, A, B, C, and D, are located at equally spaced positions around the circle in the virtual space arrangement 300A. In FIG. 3B, five parties, A, B, C, D, and E, are located at equally spaced positions around the circle in the virtual space arrangement 300B. In FIG. 3C, six parties, A, B, C, D, E, and F are located at equally spaced positions around the circle in the virtual space arrangement 300C. In each of the arrangements shown in FIGS. 3A-C, the field-of view (FOV) of each of the local parties that includes all of the remote parties is less than 180 degrees. Other embodiments are well suited to virtual space arrangements of N parties in which a FOV of any local party may be smaller or greater than 180 degrees .

In effect, to relate the virtual space arrangement with the physical experience of a local party at a local site, although the N parties in FIGS. 3A-C are at N physically separated sites, a local party at its respective site would appear to physically look at the other N−1 parties as if all the N parties are seated around a large circular table. This equally spaced arrangement around a circle in virtual space is equivalent to placing the N parties at the corners of an equilateral, N-sided polygon, as shown in FIGS. 3A-C.

Further, the virtual space arrangement accounts for physical limitations associated with each of the N sites, in one embodiment of the present invention. For example, the process for selecting a virtual space arrangement of the parties in the videoconference may be based in part on knowledge of the physical specifications of the displays at each site. That is, at conference start up, each site may communicate a description of its display (e.g. angles subtended, shape, etc.), for example to a virtual space arrangement selector (e.g., selector 110 of FIG. 1). The virtual space arrangement selector then decides how to arrange people so that at all sites, all the other N−1 parties are displayed properly. For example, in a 4-way conference, if 3 parties had 180 degree displays, while the 4th party had a narrow 45 degree display, the virtual space arrangement selector module could group the first three parties close together in virtual space and position the 4th party directly opposite. In that way, the 4$^{th}$ party is able to view the remaining parties in its display with narrow FOV. Each of the other three parties would have no problem seeing the remaining parties because their wide angle displays allow a large enough FOV to view parties to each side as well as in front of them According to embodiments of the present invention, each site participating in a videoconference should display the remote parties in a manner consistent with the agreed upon virtual space arrangement. Returning to FIG. 2A, at 220, the present embodiment at a local site simultaneously displays N−1 video sequences of representations of the N−1 remote sites at display locations on a non-planar display arrangement arranged around a local party at the local site. The present embodiment receives from the N−1 remote sites video sequences that contain, or that may be used to construct, N−1 video views of the N−1 remote parties. As such, the party at the local site is presented with one view of each of the N−1 parties at the N−1 remote sites. Each of the N−1 video sequences represents a view of a corresponding remote party for the local party consistent with the virtual space arrangement. That is, each view of a remote party appears to originate approximately from the display location of the local party in the display arrangement of the corresponding remote party at its remote site. The display locations of the N−1 remote sites on the local display arrangement are directionally consistent with the virtual space arrangement. That is, views of the N−1 remote sites appear on the local display arrangement in directions relative to the preferred location of the local party that are consistent with the directions between the local party and the respective remote parties in the virtual space arrangement. As a result, the N−1 remote sites are displayed to provide reciprocal site-accurate eye contact between the local party at the local site and N−1 remote parties at said N−1 remote sites.

In one embodiment of the present invention, a large display surface is used to display images of the remote parties at a local site. The large display surface wraps around approximately 180 degrees of the field of view of the local party's participants at that local site. In one embodiment, the display surface at one site is a semi-circular arc, and participants of the local party at that site are assumed to be seated close to the center of the arc. The remote parties are displayed with equal spacing along the arc, at angles from the arc center corresponding to the angles from one corner of the N-sided equilateral to each of the other corners, as shown by FIGS. 3A-C. For a given N, the angles in degrees of the other N−1 participants along the wall are equally spaced in the range from −90(N−2)/N to 90(N−2)/N, where zero degrees corresponds to the center of the display surface.

Figure 4A:
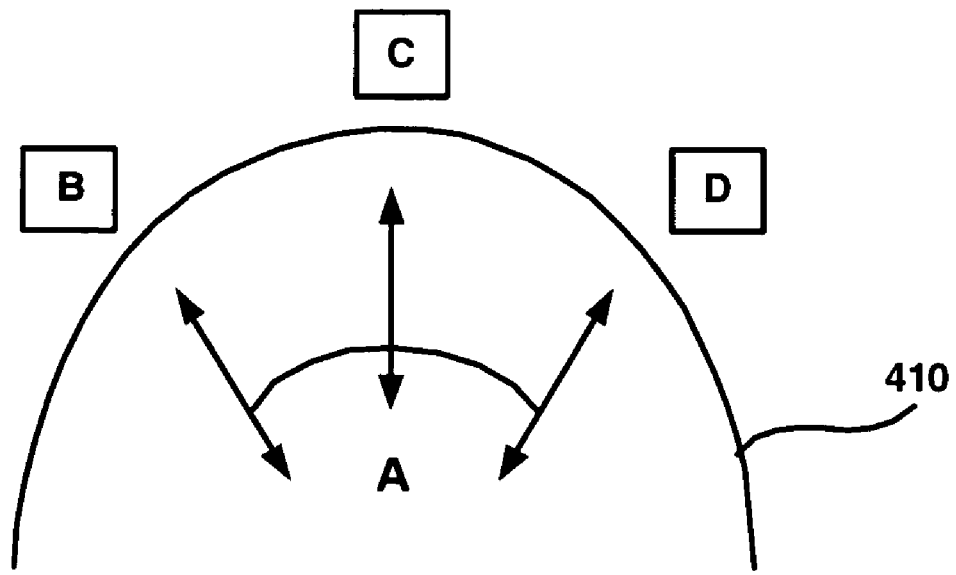
FIG. 4A provides an illustration of a virtual space arrangement of four parties as displayed at a local site, in accordance with one embodiment of the present invention.

FIG. 4A provides an illustration of the virtual space arrangements of four parties as displayed at a local site (e.g., site A). The four parties are located at equally spaced positions around a two-dimensional circle, as shown in FIG. 3A. FIG. 4A shows where a party at site A would see the other three remote parties (B, C, and D) along the semi-circular display arrangement 410. As shown in FIG. 4A, the angular spacing between the displayed representations of each of the remote parties is approximately 45 degrees.

Figure 4B:
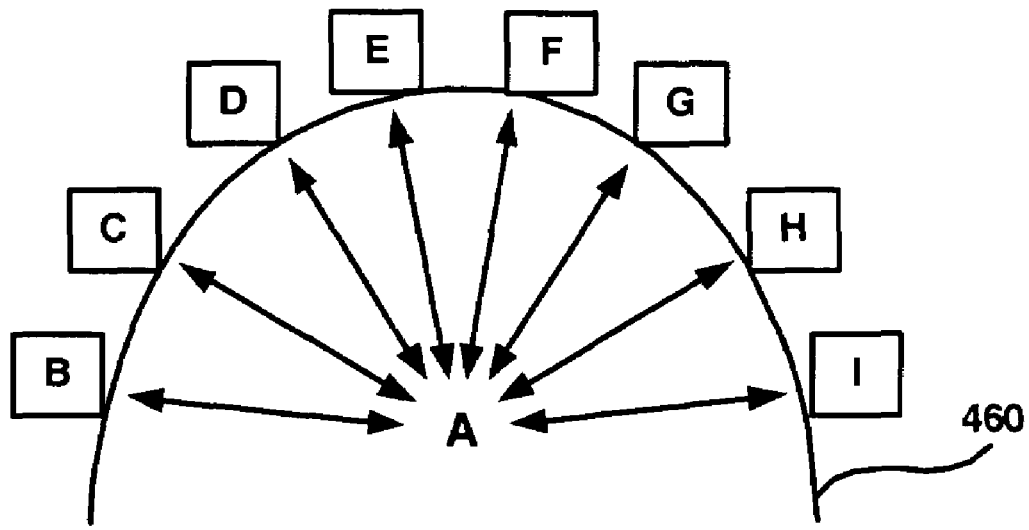
FIG. 4B provides an illustration of a virtual space arrangement of nine parties as displayed at a local site, in accordance with one embodiment of the present invention.

FIG. 4B provides an illustration of the virtual space arrangements of nine parties as displayed at a local site (e.g., site A). In the present case, the nine parties are located at equally spaced positions around a two-dimensional circle. FIG. 4B shows where a party at site A would see the other eight remote parties (B, C, D, E, F, G, H, and I) along the semi-circular display arrangement 460. As shown in FIG. 4A, the angular spacing between the displayed representations of each of the remote parties is approximately 20 degrees.

FIGS. 5A, 5B, 5C, and 5D illustrate how at each site in a four-way videoconference, the remote parties may be positioned along the display surfaces in a manner that is consistent with a single circular virtual space arrangement of the parties. The ordering of the four parties at any given site, starting with the local party and sweeping from left-to-right along the display surface, is a cyclic permutation of the analogous orderings obtained for every other site. This cross-site consistency in the geometric arrangement of the displayed parties is critical to achieving site-accurate eye contact. As shown in FIGS. 5A-D, the geometric spacing of the remote parties as displayed at each of the sites is consistent. For instance, the spacing between each of the remote parties as displayed in FIGS. 5A-D is approximately 45 degrees.

While embodiments of the present invention are described in an N-sided-equilateral virtual arrangement of the N communicating parties, other embodiments of the present invention provide for the arbitrary virtual space arrangement of the communicating parties. What is consistently required is that all communicating sites agree on the same virtual space arrangement, and that the relative locations of each pair of parties are consistent across all the sites. In other words, all sites should display the communicating parties in a mutually consistent manner.

To produce site-accurate eye contact and maintain a lifelike realism to the videoconferencing session, embodiments of the invention require the display arrangement at each site be angularly large enough, from the viewpoint of the preferred location of local participants, to accommodate the full range of directions at which remote parties must be displayed in order to maintain directional consistency with the N-party virtual space arrangement. That is, the display located at each of the N sites in the videoconference subtends a sufficiently large portion of the local party's field-of-view in order to show, to the preferred viewing location of the local party, all the other parties at the angles at which they would appear if they were physically arranged about the local party according to geometry of the virtual space arrangement. In other words, the display is angularly large enough to show all the parties in the directions at which they exist in the virtual space arrangement.

In some embodiments, the large display surface is also large enough to show participants at remote sites at life-size. That is, the remote parties are displayed as if they were physically located at distances from the local party equal to their distances from the local party in their arrangement in virtual space. This is achieved by representing the distances between the local party and the remote parties in the virtual space arrangement through scaling of the displayed representations of the parties. In other words, in some embodiments of the invention, representations of the N−1 remote parties on the display surface are scaled in proportion to the distances of these parties from the local party in the N-party virtual space arrangement. In some of these embodiments, the size of the representations are scaled so that the people appear to be their true size if they were actually seated at distances from the local party equal to their distances in the N-party virtual space arrangement.

In other embodiments, the scaling does not produce true size representations, but the relative size of the various N−1 remote parties matches the relative order of their distances in the virtual space from the local party. In still other embodiments, the representational size of remote parties is dictated in part by the need to easily see these remote participants, so that representations of remote participants of interest are increased beyond that dictated by the virtual space arrangement. Distances of participants may also be indicated via computer graphics methods that increase the blurriness or haziness of parties at greater distance from the viewer.

As a result, with the creation of the virtual space arrangement and display of parties consistent with the virtual space arrangement, site-accurate eye contact is achieved between the N parties at the N sites in the video conference. Consistent with this site-accurate eye contact, the following conditions are achieved in a virtual space arrangement including at least a party A, party B, and party C.

First, when a participant in party A (at site A) looks at the displayed representation of any participant in any remote party B, each participant at site B generally perceives the participant at site A to be more likely looking at participants at party B, rather than to be looking at any participant in any other remote party.

Figure 5A:
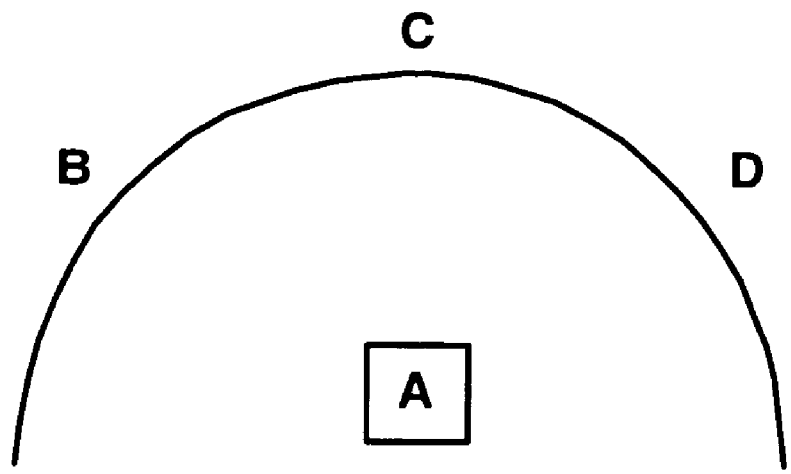
FIGS. 5A, 5B, 5C, and 5D illustrate how at each site in a four-way videoconference the remote parties may be positioned along display surfaces in a manner that is consistent with a single circular virtual space arrangement of the parties, in accordance with embodiments of the present invention.
Figure 5B:
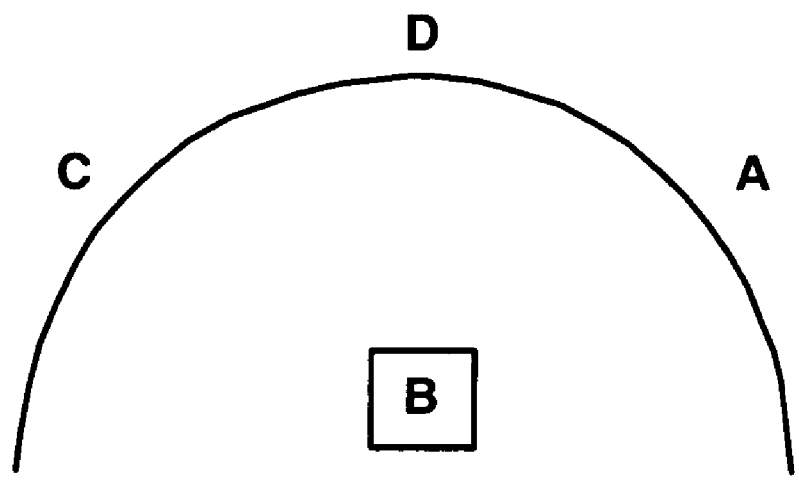
Figure 5C:
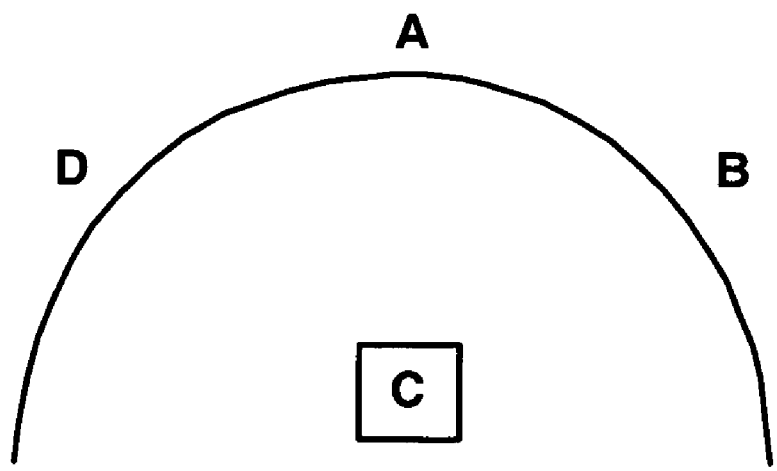
Figure 5D:
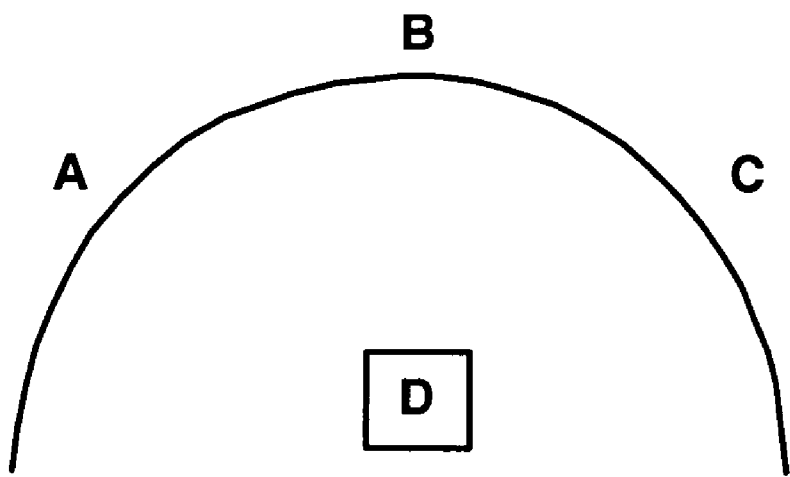

Second, when a participant in party A looks at the representation of a participant in some party C displayed at site A to the right (from the viewpoint of a participant in party A) of participants in party B (e.g., FIG. 5A), each participant in party B generally perceives the participant in party A to be more likely looking at participants in some party displayed to the left (from the viewpoint of participants in party B) of the displayed representation of party A at site B (e.g., FIG. 5B). An analogous effect holds when participants in party A look at participants displayed at site A to the left of party B.

Third, as participants in party A look at parties displayed increasingly far to the left or right of the representation of party B, participants in party B perceive them as likely to be looking at parties displayed increasingly far to the right or left, respectively, of the displayed representation of party A at site B.

Display Surface

In one embodiment, the display surface is covered with one or more emissive components, such as an array of plasma screens, an array of LCD panel displays, a single large LCD panel display, or a flexible LCD panel or organic LED array. One or more display controllers (e.g., computers) control these one or more display components in a manner that allows the displays to be treated as a single large display. In other embodiments, an array of projectors are able to cover a large display surface with light, and are controlled by one or more controllers that allow the projector outputs to be coordinated to produce the effect of having a single large display. In some of these and other embodiments, as N is varied, the controllers driving the display separate the display area into N−1 viewing zones with centers positioned at specific locations along the display surface. A representation of one remote party is centered approximately at each of these locations. The locations are determined as discussed in the various embodiments described herein.

For display surfaces composed of multiple emissive components and/or multiple projected images, calibration methods should be used to blend the component displays as much as possible into what appears to be a single large display, in accordance with one embodiment of the present invention. Methods for accomplishing this calibration have been described in the computer vision and image processing art.

Some embodiments of the invention employ display surfaces or shapes that approximate a semi-circular arc filling a substantial portion of the field-of-view of participants of the local party when they are seated within an expected viewing zone. Other embodiments of the invention employ display surfaces that are not semi-circular arcs. For example, it is possible to use 3 walls of a rectangular room to achieve a wrap-around display for one or more participants seated in the room. Alternatively, spherical sections, circular arcs subtending much less than 180 degrees, and other concave (from the perspective of the viewer) surfaces may be used. Even a flat display may be used, although this may make it more difficult to accurately simulate the N-sided equilateral virtual geometries of N communicating parties for large N. For flat displays, smaller N or alternative geometries may be more suitable.

In some embodiments, it may be preferable at some sites to display the remote parties in a manner that does not perfectly simulate their virtual space arrangement. Also, in some embodiments, it may not be possible at some sites to display the remote parties in a manner that perfectly simulates their virtual space arrangement. In these embodiments, the physical display of the parties may approximate, or distort, their virtual space arrangement. For instance, it may be desirable to increase the spacing of the remote N−1 parties along the display surface beyond what is dictated by the virtual space geometry of the participant positions, in order to better use its full extent. Alternatively, it may be desirable to compress this spacing to less than is dictated by the virtual geometry in order to fit the other N−1 participants better onto a limited display surface. This can be done for any display surface shape, or for any choice of virtual space arrangement of the participants.

Figure 6A:
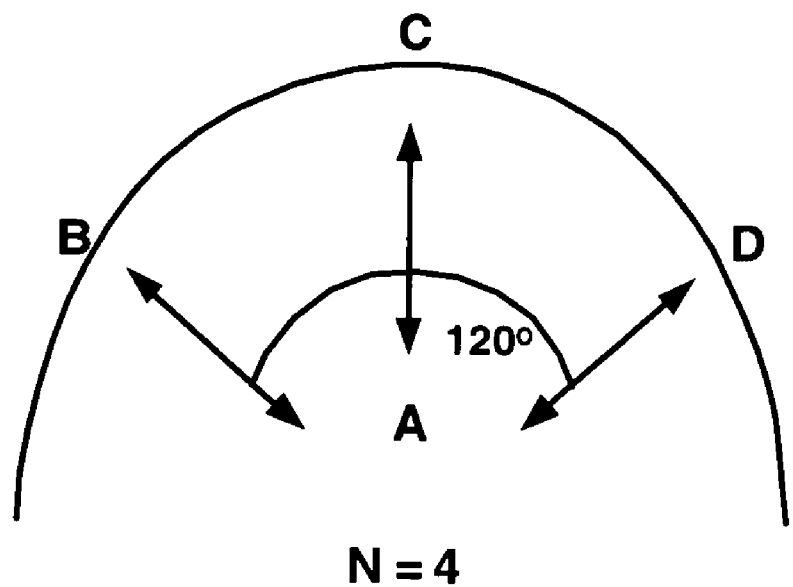
FIG. 6A provides an illustration of a virtual space arrangement of four parties as displayed at a local site with increased spacing between displayed parties, in accordance with one embodiment of the present invention.
Figure 6B:
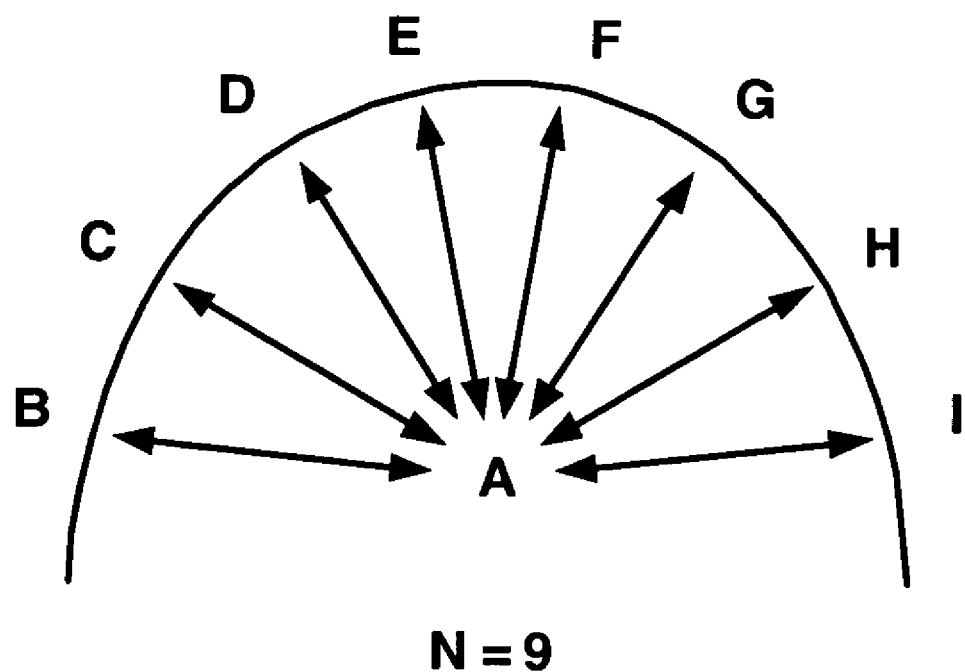
FIG. 6B provides an illustration of a virtual space arrangement of nine parties as displayed at a local site with increased spacing between displayed parties, in accordance with one embodiment of the present invention.

FIGS. 6A and 6B shows examples of increased spacing of parties around a semi-circular wall, beyond what is dictated by a circular, equally-spaced arrangement of the parties in virtual space, in accordance with some embodiments of the present invention. For example, the spacing between the displayed parties in FIG. 6A is greater than the spacing between the displayed parties in FIG. 4A, where in both figures N equals four. Also, the spacing between the displayed parties in FIG. 6B is greater than the spacing between the displayed parties in FIG. 4B, where in both figures N equals nine. This causes the directions at which the local party must look to see each of the other N−1 parties to not exactly match the geometry of the arrangement of the N parties in virtual space. This, in turn, causes perception of eye gaze between two parties, as observed by a third party, to be less accurate. More precisely, the deviation of the gaze away from being directly at the observer is exaggerated, so that in many instances it is actually easier to determine that the other party is looking at someone other than oneself. Also, the increased spacing has little effect on perception of mutual eye gaze between two parties (i.e. when party A looks at his displayed representation of party B, party B still perceives that A is looking at him). Hence, distortions of the display geometry away from precise consistency with the virtual space arrangement of conferencing parties may be advantageous in some embodiments.

When the physical display at a site distorts the virtual space arrangement of the parties, some limits on this distortion may be made in order to allow site-accurate eye contact to be maintained in a reasonably accurate fashion, in accordance with one embodiment. Specifically, when a participant at a site sweeps his gaze from left to right across his physical display, the ordering in which views of remote sites appear should match that which would be obtained by an analogous radial sweep of gaze in the virtual space from the participant's virtual space location, even when the display locations of remote parties at that site have been distorted away from consistency with the N-party virtual space arrangement. That is, relative directional consistency between parties is maintained by the distortion, although some of the remote party display directions may no longer be absolutely aligned with the virtual space arrangement.

Virtual View Generation

Figure 2B:
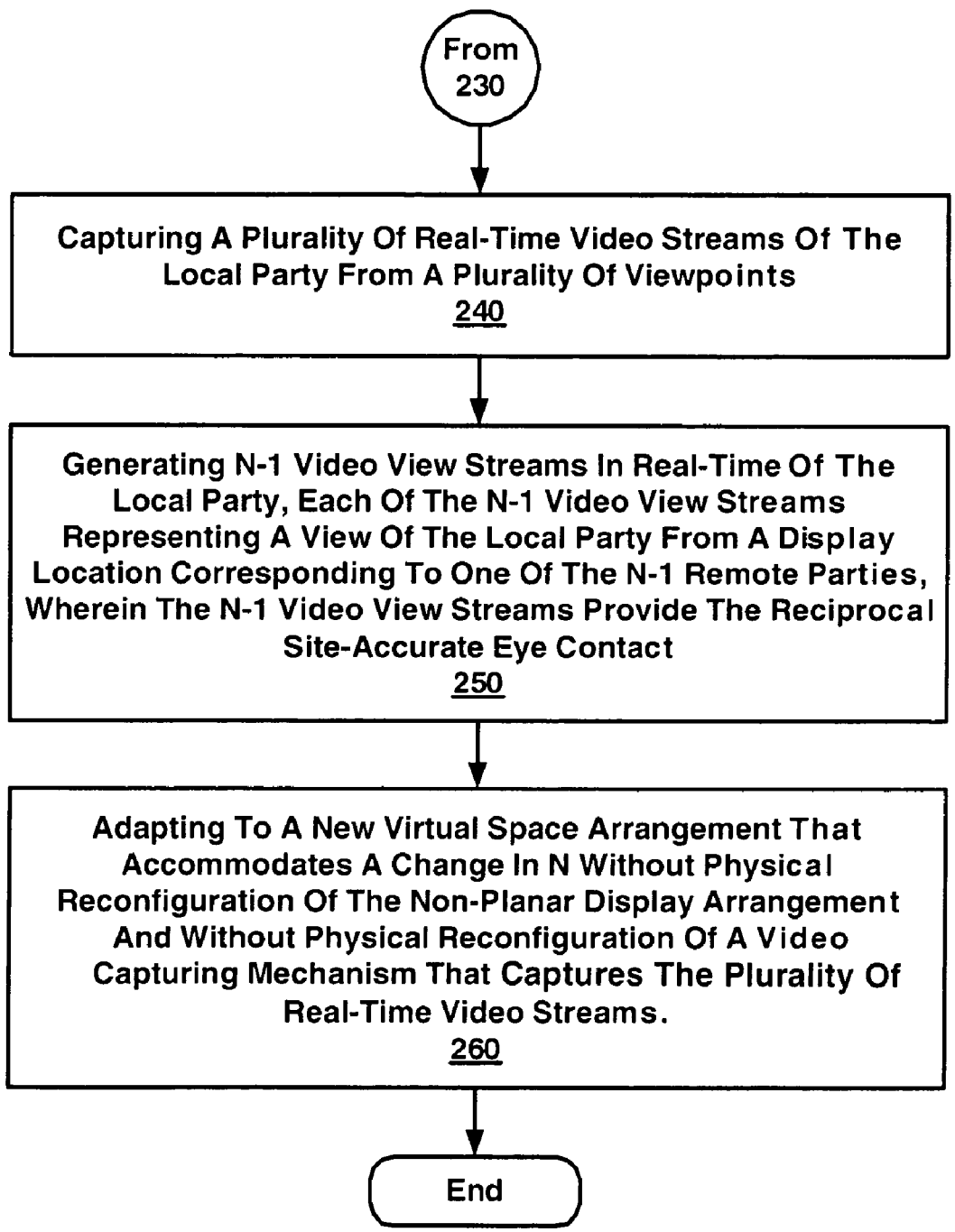
FIG. 2B is a flow chart illustrating steps in a computer implemented method for videoconferencing between N parties at N sites that is capable of generating a virtual view of a local party, in accordance with one embodiment of the present invention.

FIG. 2B is a flow chart 200B illustrating steps in a computer implemented method for providing videoconferencing between N parties at N sites, in accordance with one embodiment of the present invention. Specifically, the method of FIG. 2B is able to generate video streams containing virtual views of a local party for display at remote sites. The virtual views of the local party provide site-accurate eye contact between the local party and the remote parties.

At 240, the present embodiment captures a plurality of real-time video streams of the local party from a plurality of sample viewpoints. The number of video capture devices and sample viewpoints may be more or less than N−1, although preferred embodiments use more than N−1. These streams are used to generate N−1 video streams comprising virtual views of the local party, for transmission to the respective N−1 remote sites. The directions from which these N−1 virtual views originate do not necessarily correspond to the sample viewpoints from which physical video capturing devices view the local party. In one embodiment, at least one of the N−1 virtual view streams of the local party is generated from one video capturing device at one of the plurality of sample viewpoints. In another embodiment, at least one of the N−1 virtual view streams of the local party is generated from more preferred embodiments use more than N−1. These streams are used to generate N−1 video streams comprising virtual views of the local party, for transmission to the respective N−1 remote sites. The directions from which these N−1 virtual views originate do not necessarily correspond to the sample viewpoints from which physical video capturing devices view the local party. In one embodiment, at least one of the N−1 virtual view streams of the local party is generated from one video capturing device at one of the plurality of sample viewpoints. In another embodiment, at least one of the N−1 virtual view streams of the local party is generated from more than one video capturing device at more than one sample viewpoint. Each view stream should appear to originate approximately from the location on the local party's display surface at which the remote party that will receive the transmitted view stream is displayed. As such, the viewpoint of each virtual view stream appears to be taken from the location of the remote party toward the local party both in the virtual space arrangement that includes the N parties, as well as in the physical arrangement of the displayed remote parties at the local site.

The operation in 240 can be implemented within a system that is acquiring video sequences of the local party from one or more reference cameras simultaneously. In some embodiments, this is achieved through use of an array of rigidly affixed cameras embedded in, attached to, or slightly behind the display surface. With a sufficient number of such cameras, views from arbitrary locations within the three dimensional (3D) hull defined by the locations of the cameras can be synthesized with reasonable accuracy, even if no physical camera exists at these locations. This task is known as virtual view synthesis, since it involves constructing a view of a scene from a virtual camera location at which no physical camera exists. Many methods for accomplishing virtual view synthesis from camera arrays are known in the art, with some being based on view interpolation of the physical cameras, or extraction of 3D scene information followed by re-rendering of the 3D scene from a new angle.

In some embodiments of the present invention, generation of a view of a local party is performed at the local site, with a video stream containing the view later being transmitted to the corresponding remote site. In other embodiments, the local site sends imagery or other data to a remote site, where generation of a view consistent with the N-party virtual space arrangement is performed to construct a view of the local party from approximately the direction at which this remote party is displayed at the local site. In still other embodiments, generation of the view of a local party required by a remote party is performed in part at both the local and remote sites.

Figure 7:
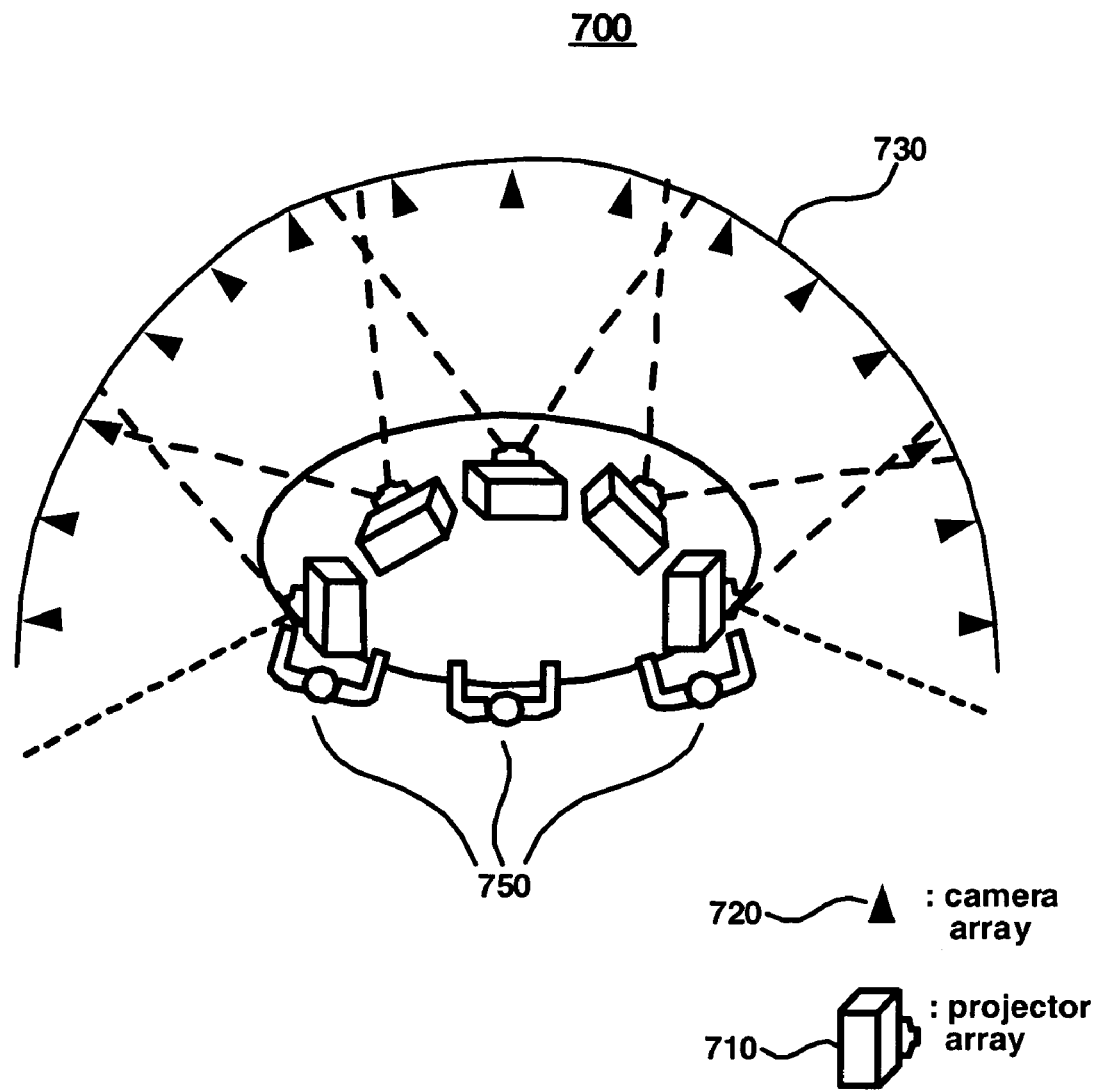
FIG. 7 shows an overhead view of a system 700 that is capable of generating N−1 real-time video view streams of a local party and displaying view streams of N−1 remote parties, for any N, in accordance with one embodiment of the invention.

FIG. 7 shows an overhead view of a system 700 that is capable of capturing real-time video streams of a local party and displaying views of N−1 remote parties, in accordance with one embodiment of the invention. Projector array 710 is used to produce an arbitrary number of views of remote communicating parties along a semi-circular display wall 730. A camera array 720 attached to the wall 730 is used to construct the corresponding views of the local party 750 from each of the local display locations of the remote parties. Each view of the local party 750 is transmitted only to the remote party that is displayed at the display surface location from which the view originates. Additionally, the local party 750 receives unique views, or data that may be used to construct unique views, of each of the N−1 remote parties with which it communicates. In each case these unique views originate approximately from the center of the location in the remote environment at which the local party is displayed.

Returning now to FIG. 2B, as a result, at 250, the present embodiment generates N−1 video view streams in real-time of the local party. Each of the N−1 video view streams represents a view of the local party from a display location corresponding to one of the N−1 remote parties. Some embodiments of the present invention are capable of generating views of the local party from a new virtual viewpoint that does not correspond to any of the current views of the physical reference cameras at the local site. Various reconstruction techniques, as well as new-view synthesis techniques, can be used to render views of the local party from the new virtual viewpoint.

In one embodiment, a three dimensional model of the local party is constructed. Then, the present embodiment renders the N−1 video view streams as graphic representations of the three-dimensional models as viewed from the corresponding directions at which the remote parties are displayed on said display surface at the local site.

At 260, the present embodiment is able to adapt to a new virtual space arrangement that accommodates a change in N without physical reconfiguration of the non-planar display arrangement and without physical reconfiguration of a video capturing mechanism that captures the plurality of real-time video streams. More specifically, at each site, N−1 views of the local party should be generated without requiring physical changes to the installed video capture equipment. Correspondingly, at each site, the display surface is able to display N−1 views of remote parties, for any choice of N greater than or equal to two, without requiring physical changes to the installation. That is, the number of remote parties may be varied seamlessly, without requiring manual intervention beyond, at most, specifying the number N and/or a virtual space geometry of N participants to a computer or electronic system. No manual repositioning of visual capture or display equipment is needed.

In addition, the present embodiment is able to adapt to geometric changes in locations of the sites in the virtual arrangement where N remains constant. That is, the site location in the virtual space arrangement may change in relation to other sites in the videoconference.

Generalized Virtual Space Arrangements

In general, the virtual space arrangement of the N parties may be of any geometry. Each site should attempt to display the remote parties as if viewed in the virtual space from the virtual viewpoint of the local party, optionally allowing minor distortions as described above that will not significantly undermine site-accurate eye contact. The display surface at a given site preferably subtends a visual angle large enough to accommodate the minimal arc through which a participant at that site must turn to see each of the other communicating parties if they were physically arranged as in the virtual space geometry. For instance, for three communicating parties virtually arranged at the corners of an equilateral triangle, displays filling, from the expected viewing location of the local party, roughly 60 degrees of the FOV plus extra width to account for the size of the representations of the parties, could be used at all sites. If the physical display at a site has insufficient breadth to accommodate an accurate physical simulation of the virtual arrangement, the remote parties may be compressed into a display with smaller extent, as described above in the examples of acceptable display distortions.

Figure 8:
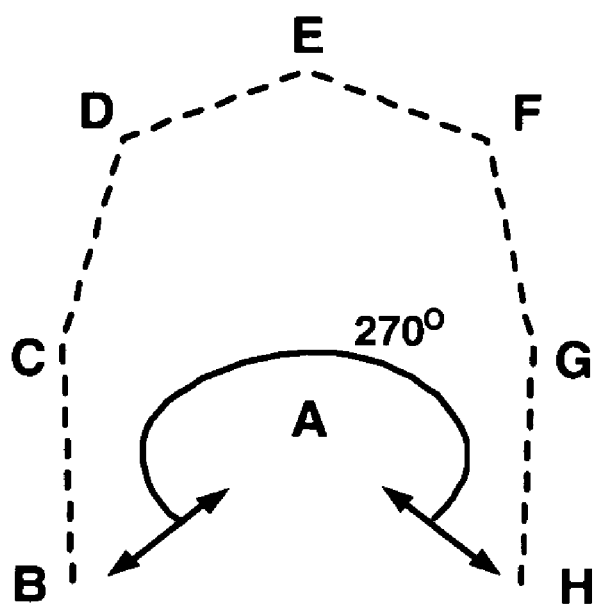
FIG. 8 shows an example of a non-circular, two-dimensional arrangement of eight parties in a videoconference, in accordance with one embodiment of the present invention.

FIG. 8 shows another example of a non-circular, two-dimensional arrangement of eight parties in a videoconference, in accordance with one embodiment of the present invention. In this case, the display surface for party A should preferably subtend a visual angle close to 270 degrees. Also, note that the display for party H may show participant A between parties C and D, and also closer (e.g. larger, less blurred, and/or partially occluding parties C and D).

Other arrangements may order parties in a one-dimensional space, such that the physical display at each site attempts to render the correct ordering and spacing of parties along this line, but gives no indication of two-dimensional distance between parties, e.g., via scaling of the size of displayed representations of parties as described above. In still other embodiments, three-dimensional virtual arrangements may be used, such that not all parties lie in the same virtual plane. This may cause some parties to be rendered in such a way that they appear to be seated higher or lower than other parties in the displays seen by other parties. For instance, a stadium-like, three-dimensional seating arrangement might be used to accommodate large numbers of videoconferencing parties, with rows of some parties appearing above and behind rows of other parties.

Distortions of one- and three-dimensional virtual space arrangements, for example to accommodate the constraints of the physical environment at a site or to intentionally exaggerate eye contact cues, may be made in manners similar to those described above for two-dimensional arrangements. For example, the spacing among participants may be increased or decreased, or their representations may be scaled in size. For one-dimensional arrangements, embodiments of the present invention require that any such distortion preserves the ordering of the parties along the one-dimensional parameterization of locations. In general, distortions of physical display locations of remote parties away from consistency with the N-party virtual space arrangement should be restricted such that, when a participant at a site with distorted display locations sweeps his gaze from left to right across his physical display, the ordering in which views of remote sites appear should match that which would be obtained by an analogous radial sweep of gaze in the virtual space from the participant's virtual space location.

Background Removal

In some embodiments of the present invention, computer vision techniques are used to analyze imagery of each party and separate them from their backgrounds. The foreground image of each party may then be composited onto a new background for display at other sites. For example, in some embodiments, background removal is applied during capture of imagery of all participating parties, and then all parties are composited together onto the same background when displayed at any particular site. The choice of background may differ from site to site, but at a given site, the same background is placed behind all displayed renderings of remote parties. In some embodiments, the choice of background at a given site is made to match it to the physical environment (e.g. the walls, lighting, etc.) at that site. Many methods for background removal are known in the art of computer vision.

Audio Capture and Rendering

Some embodiments of the present invention include audio capture, transmission, and playback across the N participating sites. In this manner, video and audio communication is accomplished between all of the N sites, such that interactive conversations may be conducted between participants at separate sites. In some embodiments, monaural audio capture is performed at each site. At each local site, the monaural audio streams from the N−1 remote sites are mixed to form a single monaural stream for rendering to the local site. In other embodiments, audio received from the N−1 remote sites is rendered consistently at the local site with the virtual space arrangement. In other words, in these embodiments, spatialized audio capture and rendering is employed to simulate, at each site, the positioning of the N−1 remote parties as if physically located at their positions in the virtual space arrangement. This causes voices from remote parties to appear, to the local party at the local site, to emanate from the directions at which the remote parties are shown on the display surface at the local site. Many methods for capturing and rendering spatialized audio are known in the audio processing art.

Adaptation to Changes in N without Physical Reconfiguration

Figure 9:
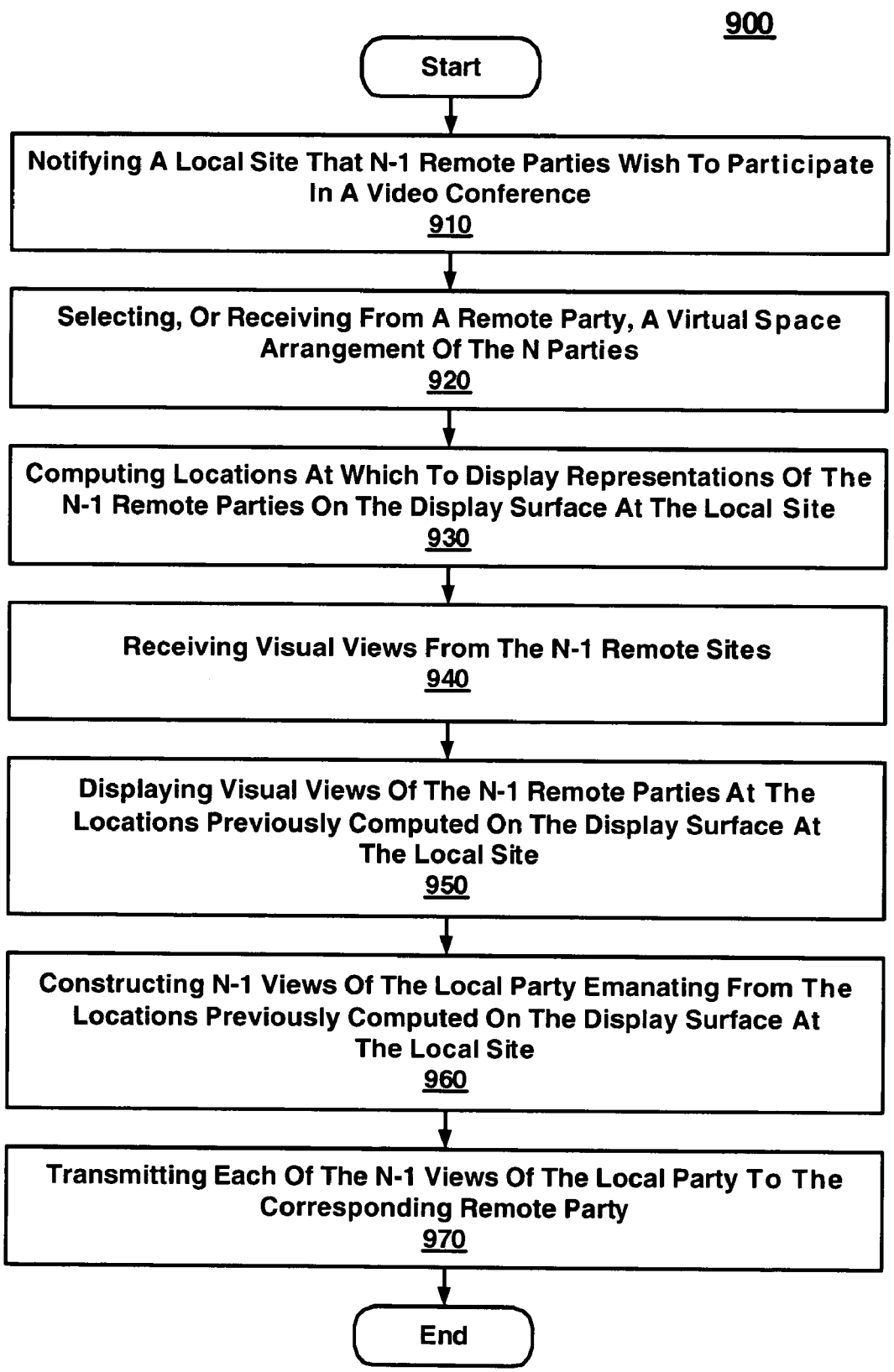
FIG. 9 shows a flowchart 900 of an overview of the steps required at single site for establishing and conducting a communication session with N−1 other parties, in accordance with one embodiment of the present invention.

FIG. 9 shows a flowchart 900 of an overview of the steps required at a single site for establishing and conducting a communication session with N−1 other parties in accordance with one embodiment of the present invention. N can be any number greater than or equal to two. It is important to note that 950 and 960 do not require reconfiguration of physical video capture and display equipment as N varies. Also, 940, 950, 960, and 970 occur concurrently during an ongoing communication session.

Conference session management functionality is used by the present embodiment to add or remove videoconferencing parties. A conference session manager may be resident at any one the conferencing sites, or session management functionality may be distributed across one or more of the sites, or it may reside in a separate location (e.g. on the Internet) with which all of the conferencing sites have contact (e.g. via a computer network connection). When videoconferencing sites contact each other directly to join or leave sessions, the session manager functionality may be considered to be distributed across all of the conferencing sites.

At 910, the session manager of the present embodiment notifies a local site that N−1 remote parties wish to participate in a video conference with this site. At 920, a virtual space arrangement is selected by the local site, in one embodiment, as previously described, and communicated to other conferencing parties. In another embodiment, the virtual space arrangement of the N parties is received from a remote party, as previously described. In still other embodiments, the virtual space arrangement is chosen by the conference session management functionality, or through a collaborative process between components at the separate videoconferencing sites.

At 930, the present embodiment computes locations P at which to display representations of the N−1 remote parties on a display surface at the local site, as previously described. At 940, visual views of the N−1 remote parties, and/or data sufficient to construct them, are received, as previously described. These visual views and/or related data are received from the N−1 remote parties. At 950, the visual views of the N−1 remote parties are displayed at the previously computed locations P, as previously described. These visual views are displayed on the display surface at the local site.

At 960, the present embodiment constructs N−1 virtual view streams of the local party, as previously described. The N−1 views appear to emanate from the previously computed locations, P, on the display surface of the local site. At 970, each of the N−1 views of the local party are transmitted to the corresponding remote party, as previously described.

Figure 10:
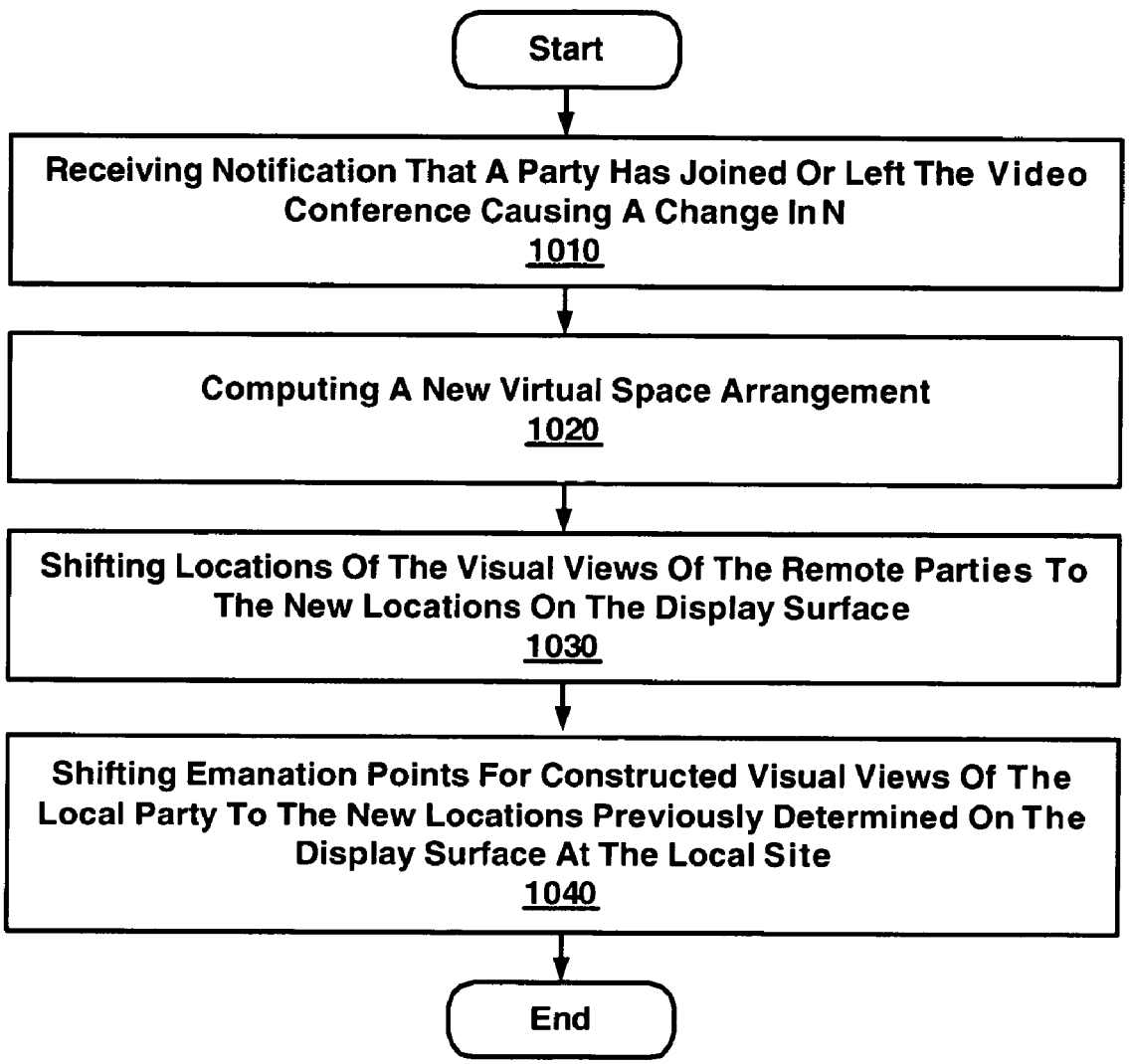
FIG. 10 shows a flowchart 1000 illustrating steps in a computer implemented method for conducting a video conference of N participants in which N is changed, in accordance with one embodiment of the present invention.

FIG. 10 shows a flowchart 1000 illustrating steps in a computer implemented method for conducting a video conference of N participants in which N is changed, in accordance with one embodiment of the present invention. As such, the present embodiment allows the number N to vary during an ongoing videoconferencing session. In one embodiment, these changes can be accommodated by iterating 920 and 930 whenever parties join or leave the video conference. FIG. 10 provides in more detail the operations necessary to accommodate for a change in N.

At 1010, the present embodiment receives notification that a party has joined or left the videoconference. This causes the number of videoconferencing parties to change from N to a new number M (either N−1 or N+1, for example). At 1020, a new virtual space arrangement is computed by the local site, in one embodiment, and communicated to other conferencing parties. Alternatively, in other embodiments, the new virtual space arrangement is received from a remote party that is participating in the video conference or from the conference session management functionality, or is computed through a collaborative process between components at the separate videoconferencing sites.

The present embodiment has previously computed locations, P, at which to display representations of the N−1 remote parties on a display surface at the local site, as previously described. At 1030, some of these N−1 locations, P, are shifted to M−1 new locations P'. One view of a remote party will be eliminated if that party left the conference, or a new view will be added at one of the new locations P' if a new party has joined. In this manner visual views of the remote parties are shifted to the new locations, P'. As such, the visual views of the remote parties are presented on the display at the local site at the new M−1 locations, P'. At 1040, emanation points for constructed visual views of the local party are also shifted to the new locations, P', on the display surface at the local site. Visual views of the local party to be transmitted for the M−1 remote parties are generated as described previously.

Accordingly, embodiments of the present invention provide a method and system for videoconferencing between N parties located at N separate physical sites, where N is greater than or equal to two. Specifically, embodiments of the present invention provide, at each site, for a display that subtends a substantial portion of the visual fields of views of one or more participants seated near a preferred position. Also, embodiments of the present invention provide for views, of a local party, seen by parties at remote sites, that appear to originate approximately from the directions at which the respective remote parties are displayed at the local site, to provide for site-accurate eye contact between the N parties of the videoconference. Further, embodiments of the present invention exhibit consistent ordering of the conferencing parties in a virtual space arrangement. That is, when a participant at any site sweeps his gaze from left to right across his physical display, the ordering in which views of remote sites appear matches that which would be obtained by an analogous radial sweep of gaze in the virtual space from the participant's virtual space location. In addition, embodiments of the invention provide all of the above for any N greater than or equal to two without requirement of physical reconfiguration of displays or video capturing mechanisms.

While the methods of embodiments illustrated in flow charts 200A, 200B, 900 and 1000 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

A method and system for video conferencing between N parties at N sites that achieves site-accurate eye contact is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A method for videoconferencing between parties at N sites, comprising:

creating a virtual space arrangement of N sites including N−1 remote sites and a local site;

simultaneously displaying N−1 video sequences of representations of parties at said N−1 remote sites at display locations on a non-planar display arrangement arranged around a local party at said local site, wherein said N−1 remote sites are displayed to provide reciprocal site-accurate eye contact between a local party at said local site and N−1 remote parties at said N−1 remote sites;

scaling displayed images of said remote parties in said N−1 video sequences consistently with their true physical sizes in said virtual space arrangement;

capturing a plurality of real-time video streams of said local party from a plurality of viewpoints; and generating N−1 video view streams providing said reciprocal site-accurate eye contact in real-time of said local party representing views of said local party from display locations corresponding to said N−1 remote parties.

2. The method of claim 1, further comprising:

adapting to a new virtual space arrangement that accommodates a change in N without physical reconfiguration of said non-planar display arrangement and without physical reconfiguration of a video capturing mechanism that captures said plurality of real-time video streams.

3. The method of claim 1, further comprising:

creating an arrangement of said N sites in a virtual coordinate system that corresponds to said virtual space arrangement.

4. The method of claim 1, further comprising:

adapting to geometric changes in locations of said sites in said virtual arrangement where N remains constant.

5. The method of claim 1, further comprising:

receiving from said N−1 remote sites said N−1 video sequences of said N−1 remote parties, wherein each of said N−1 video sequences representing a view of a corresponding remote party for said local party consistent with said virtual arrangement, and wherein each of said N−1 video view streams represent a view of said local party from a display location corresponding to one of said N−1 remote parties.

6. The method of claim 1, further comprising:

equally spacing said N sites around said virtual space arrangement that comprises a circular arrangement.

7. The method of claim 1, wherein at least one of said N−1 video view streams of said local site is generated from one video capturing device at one of said plurality of sample viewpoints.

8. The method of claim 1, wherein said video capturing mechanism comprises a plurality of video capturing devices that is fixed in an array located at a surface of said non-planar display arrangement.

9. The method of claim 1, further comprising:

performing background removal to extract parties at said N−1 remote sites from their physical backgrounds; and compositing said parties of said N−1 remote sites on a single continuous background on said non-planar display arrangement.

10. The method of claim 1, further comprising:

constructing three-dimensional models of said local party at said local site; and rendering said N−1 video view streams as graphic representations of said three-dimensional models as viewed from the corresponding directions at which said remote parties are displayed on said display surface at said local site.

11. The method of claim 1, wherein at least one of said N−1 video view streams of said local site is generated using data from more than one of said real-time video streams of said local party captured at said plurality of viewpoints.

12. A system for videoconferencing between parties at N sites, comprising:

a virtual arrangement selector for creating a virtual space arrangement of N sites including N−1 remote sites and a local site, wherein each site accommodates a party comprising at least one person;

a non-planar display for simultaneously displaying N−1 video sequences of representations of said N−1 remote sites at display locations on a non-planar display arrangement arranged around a local party at said local site, wherein said display locations are directionally consistent with said virtual space arrangement, and wherein said N−1 remote sites are displayed to provide reciprocal site-accurate eye contact between a local party at said local site and N−1 remote parties at said N−1 remote sites;

a life-size scaler for scaling displayed images of said remote parties in said N−1 video sequences consistently with their true physical sizes at their distances from said local party in said virtual space arrangement;

a plurality of video capturing devices for capturing a plurality of real-time video streams of said local party from a plurality of viewpoints;

a view generator for generating N−1 video view streams in real-time of said local party, each of said N−1 video view streams representing a view of said local party from a display location corresponding to one of said N-I remote parties, wherein said N−1 video view streams provide said reciprocal site-accurate eye contact; and a controller for adapting to a new virtual space arrangement that accommodates a change in N without physical reconfiguration of said non-planar display arrangement and without physical reconfiguration of said plurality of video capturing devices at said plurality of sample viewpoints.

13. The system of claim 12, wherein said virtual arrangement selector creates said virtual space arrangement according to physical limitations associated with each of said N sites.

14. The system of claim 12, further comprising:

a receiver for receiving from said N−1 remote sites said N−1 video sequences of said N−1 remote parties, each of said N−1 video sequences representing a view of a corresponding remote party for said local party consistent with said virtual arrangement.

15. The system of claim 12, further comprising:

a background removal module for performing background removal to extract parties at said N−1 remote sites from their physical backgrounds; and a compositor for compositing said parties of said N−1 remote sites on a single continuous background on said non-planar display arrangement.

16. The system of claim 12, further comprising:

an audio spatializer for rendering spatialized audio received from said N−1 remote sites consistently with said virtual space arrangement at said local site.

17. The system of claim 12, wherein said virtual space arrangement is taken from a group consisting of:

a one dimensional arrangement;

a two dimensional arrangement; and a three dimensional arrangement.

18. The system of claim 12, wherein said non-planar display arrangement encompasses at least 180 degrees of the field-of-view of said local party at said local site.

19. The system of claim 12, wherein said non-planar display arrangement is a curved wall upon which said N−1 video sequences are projected.

20. The system of claim 12, wherein said non-planar display arrangement is a plurality of displays positioned in an arc.

21. The system of claim 12, wherein at least one party comprises at least two persons.

22. A computer readable medium containing program instructions that implement a method for videoconferencing between parties at N sites, comprising:
   creating a virtual space arrangement of N sites including N−1 remote sites and a local site;
   simultaneously displaying N−1 video sequences of representations of parties at said N−1 remote sites at display locations on a non-planar display arrangement arranged around a local party at said local site, wherein said N−1 remote sites are displayed to provide reciprocal site-accurate eye contact between a local party at said local site and N−1 remote parties at said N−1 remote sites;
   scaling displayed images of said remote parties in said N−1 video sequences consistently with their true physical sizes in said virtual space arrangement;
   capturing a plurality of real-time video streams of said local party from a plurality of viewpoints; and
   generating N−1 video view streams providing said reciprocal site-accurate eye contact in real-time of said local party representing views of said local party from display locations corresponding to said N−1 remote parties.

23. The computer readable medium of claim 22, wherein said program instructions in said method further comprise:
   adapting to a new virtual space arrangement that accommodates a change in N without physical reconfiguration of said non-planar display arrangement and without physical reconfiguration of a video capturing mechanism that captures said plurality of real-time video streams.

24. The computer readable medium of claim 22, wherein said program instructions in said method further comprise:
   creating an arrangement of said N sites in a virtual coordinate system that corresponds to said virtual space arrangement.

25. The computer readable medium of claim 22, wherein said program instructions in said method further comprise:
   receiving from said N−1 remote sites said N−1 video sequences of said N−1 remote parties, wherein each of said N−1 video sequences representing a view of a corresponding remote party for said local party consistent with said virtual arrangement, and wherein each of said N−1 video view streams represent a view of said local party from a display location corresponding to one of said N−1 remote parties.

26. The computer readable medium of claim 22, wherein said program instructions in said method further comprise:
   equally spacing said N sites around said virtual space arrangement that comprises a circular arrangement.

27. The method of claim 22, wherein at least one of said N−1 video view streams of said local site is generated from one video capturing device at one of said plurality of sample viewpoints.

28. The method of claim 22, wherein said video capturing mechanism comprises a plurality of video capturing devices that is fixed in an array located at a surface of said non-planar display arrangement.

29. The computer readable medium of claim 22, wherein said program instructions in said method further comprise:
   performing background removal to extract parties at said N−1 remote sites from their physical backgrounds; and
   compositing said parties of said N−1 remote sites on a single continuous background on said non-planar display arrangement.

30. The computer readable medium of claim 22, wherein said program instructions in said method further comprise:
   constructing three-dimensional models of said local party at said local site; and
   rendering said N−1 video view streams as graphic representations of said three-dimensional models as viewed from the corresponding directions at which said remote parties are displayed on said display surface at said local site.

* * * * *

UNITED STATES PATENT AND TRADEMARK OFFICE
CERTIFICATE OF CORRECTION

PATENT NO. : 7,528,860 B2
APPLICATION NO. : 11/118914
DATED : May 5, 2009
INVENTOR(S) : Michael Harville et al.

It is certified that error appears in the above-identified patent and that said Letters Patent is hereby corrected as shown below:

In column 5, line 64, delete "flow 200A chart" and insert -- flow chart 200A --, therefor.

In column 6, line 27, delete "paricipant's" and insert -- participant's --, therefor.

In column 6, line 32, after "sites and" insert -- a --.

In column 11, lines 50-61, after "more" delete "preferred embodiments use more. . . . . . . . . . generated from more".

In column 18, line 21, in Claim 12, after "one of said" delete "N-I" and insert -- N-1 --, therefor.

Signed and Sealed this

Fifteenth Day of December, 2009

David J. Kappos
*Director of the United States Patent and Trademark Office*